United States Patent [19]
Baldiraghi et al.

[11] Patent Number: 6,139,721
[45] Date of Patent: *Oct. 31, 2000

[54] FLUID BED CATALYTIC CRACKING PROCESS CHARACTERIZED BY A HIGH SELECTIVITY TO OLEFINS

[75] Inventors: Franco Baldiraghi, Melegnano; Paolo Ferrarini, Milan; Giovanni Faraci, S. Donato Mil.se, all of Italy; Mario Lorenzo Occelli, Atlanta, Ga.; Sergio Leoncini, S. Donato Mil.se, Italy

[73] Assignee: Agip Petroli S.p.A., Rome, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 09/042,734

[22] Filed: Mar. 17, 1998

[30] Foreign Application Priority Data

Mar. 24, 1997 [IT] Italy .................. MI97A0671

[51] Int. Cl.$^7$ ..................................... C10G 11/02
[52] U.S. Cl. .......................... 208/118; 208/113; 208/119; 208/120.1; 208/138; 423/326

[58] Field of Search ..................... 208/113, 118, 208/119, 120, 138, 120.1; 423/326

[56] References Cited

U.S. PATENT DOCUMENTS

| | | | |
|---|---|---|---|
| 4,176,090 | 11/1979 | Vaughan et al. | 252/455 |
| 4,368,114 | 1/1983 | Chester et al. | 208/120 |
| 4,410,501 | 10/1983 | Taramasso et al. | 423/326 |

*Primary Examiner*—Walter D. Griffin
*Assistant Examiner*—Nadine Preisch
*Attorney, Agent, or Firm*—Oblon, Spivak, McClelland, Maier & Neustadt, P.C.

[57] ABSTRACT

The invention relates to a fluid catalytic cracking process for the preparation of good quality hydrocarbon fractions with a high octane number starting from heavy hydrocarbon fractions of a poorer quality characterized in that the heavy hydrocarbon fraction is put in contact, under cracking conditions, with a catalytic composition comprising a conventional FCC catalyst and a quantity of between 3–60% of a hydrothermally stable microporous material containing titanium.

8 Claims, 5 Drawing Sheets

FLUID BED CATALYTIC CRACKING PROCESS CHARACTERIZED BY A HIGH SELECTIVITY TO OLEFINS

BACKGROUND OF THE INVENTION

1. Field of the Invention

The invention relates to a catalytic cracking process for the production of good quality hydrocarbon fractions, such as gasoline with a high octane number, starting from low quality heavy hydrocarbon fractions.

2. Description of the Background

More specifically, the invention relates to a fluid catalytic cracking process in which the conversion to light fractions is carried out by putting the heavy hydrocarbon fraction in contact with a fluid bed of a particular catalytic composition.

An example of fluid catalytic cracking (FCC) is described in the U.S. Pat. Nos. 4,731,174 and 4,368,114.

This process is normally used in the petroleum industry for the conversion of heavy low quality heavy hydrocarbon fractions into high quality hydrocarbon fractions such as gasolines with a high octane number and light olefinic streams ($C_3$ and $C_4$).

In 1984, in the United States, the organization for environmental protection proposed for the first time, to eliminate lead from gasolines following the diffusion of catalytic converters whose catalyst proved to be irreversibly poisoned by lead.

The elimination of Pb was initially obtained in refineries by increasing the reforming capacity, introducing MTBE and improving FCC catalysts in order to optimize both the yield of gasoline and its octane number.

In spite of the use of catalytic exhaust-pipes and gasolines richer in aromatics and olefins, however, the desired improvement in the quality of the air was not reached.

It was therefore decided to introduce "reformulated gasoline" which satisfies the specifications requested by the "Clean air Act" which are the following:

- at least 2.7% of oxygen;
- reduced level of volatile olefins;
- not more than 1% vol. of benzene;
- total aromatics not higher than 25% vol.

To satisfy these new demands, refineries directed research activities towards the study of FCC catalytic cracking processes capable of producing $C_3$, $C_4$ and $C_5$ olefins with high yields. These olefins are used for the synthesis of oxygenated additives for reformulated gasoline such as MTBE, ETBE, TAME and for the production of alkylates.

In particular, research regarded catalysts which are used in FCC processes and led to the development and sale of various new catalysts.

For example, catalysts were manufactured based on zeolites stabilized with lanthanium ions which promote transfer reactions of hydrogen which cause the conversion of olefins and naphthenes into paraffins and aromatics.

The use of these catalysts however is not recommended owing to the loss of the octane number caused by the saturation of the olefins which is greater than the gain due to the formation of aromatics.

Commercial catalysts containing USY zeolites with a low content of rare earth and additives having an MFI structure, also appeared on the market.

In 1983 Mobil introduced the ZSM5 zeolite as an additive for FCC catalysts (U.S. Pat. No. 4,368,114); this additive had the characteristic of increasing the octane properties of Catanaphta and the yield of $C_3$, $C_4$ olefins.

ZSM 5, in fact, selectively converted the low octane components removing them from the gasoline.

As already mentioned, another way of improving the octane number of gasolines, since compounds based on lead can no longer be used, consists in adding oxygenated compounds such as MTBE and TAME.

The preparation of these oxygenated compounds, which are compatible with the environment, require the use however of large quantities of $C_4$ and $C_5$ olefins.

SUMMARY OF THE INVENTION

We have now found that by using catalytic materials containing Ti added to commercial FCC catalysts in fluid catalytic cracking processes, it is possible to produce high quality olefins ($C_3$, $C_4$, $C_5$) with high yields and increase the octane number of the gasolines.

In particular the present invention relates to a fluid catalytic cracking process for the preparation of good quality hydrocarbon fractions with a high octane number starting from heavy hydrocarbon fractions of a lower quality characterized in that the heavy hydrocarbon fraction is put in contact, under cracking conditions, with a catalytic composition comprising a conventional FCC catalyst and a quantity of between 3–60% of a hydrothermally stable microporous material containing titanium.

DETAILED DESCRIPTION OF THE PREFERRED EMBODIMENTS

Figure 1:
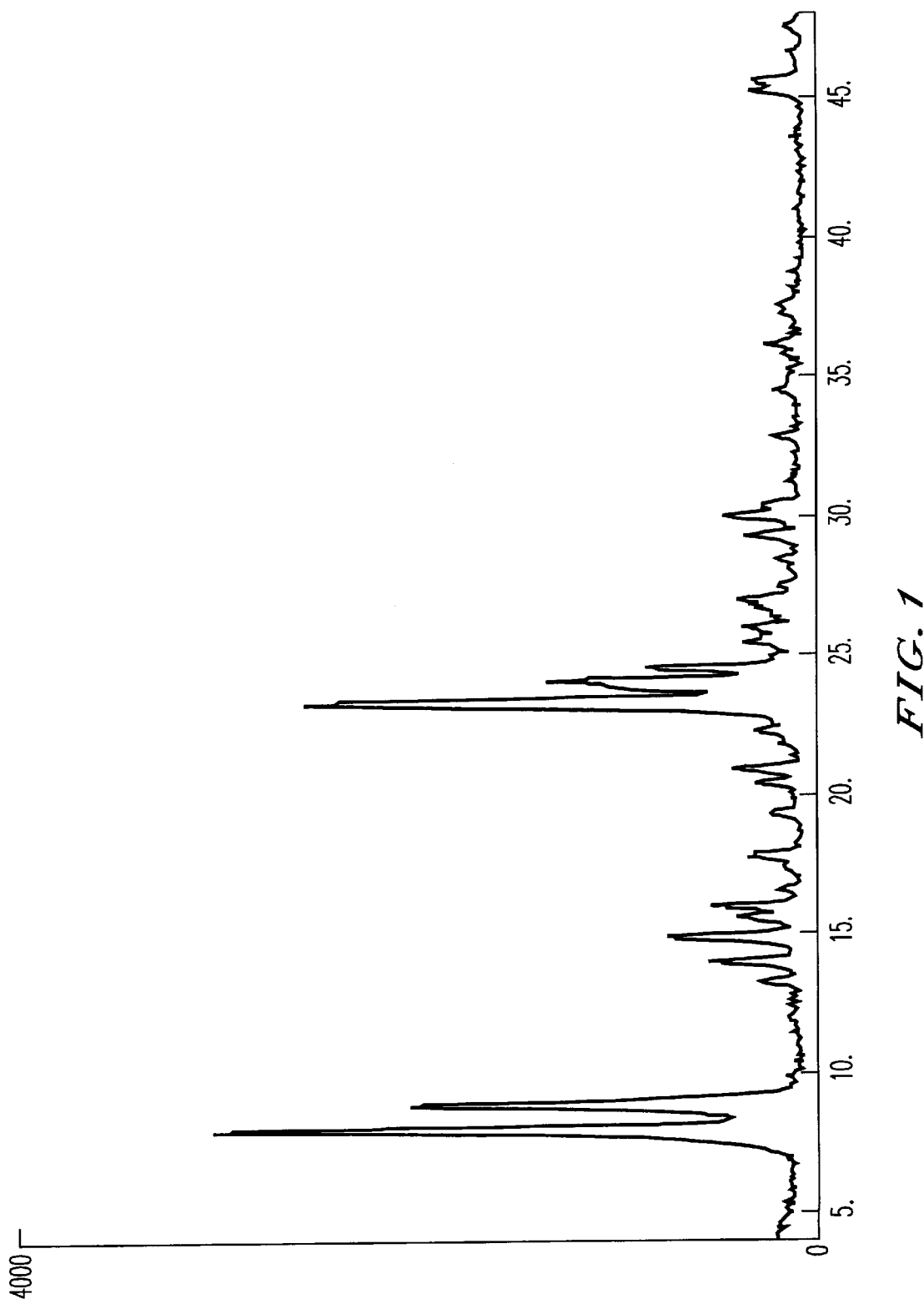
FIG. 1 illustrates an X-ray crystallogram of the calcined crystals of Example 1 of the present specification

More specifically, the microporous component of the catalyst of the invention contains at least 0.01% of titanium and is a titanium-silicate containing Ti atoms in tetrahedric coordination selected from a TS-1 with an MFI structure or a TS-2 with a MEL structure.

The selective properties relating to the form of this material together with its slightly acid properties make it particularly suitable for use in the FCC processes of the present invention.

Titanium silicalite is already used in a variety of chemical reactions such as, for example, the epoxidation of olefins, the oxidation of alcohols as well as the hydroxylation of aromatics with a high selectivity towards para isomers.

The TS-1 zeolite has a poor activity when used as such in the cracking process.

If, on the other hand, it is added to a conventional cracking catalyst, instead of provoking a loss in activity due to dilution, it causes an unexpected increase in the activity of the DFCC.

In addition to TS2 which is a titanium silicate with a MEL structure (ATLAS of zeolite structure types, W. Meier et al., HEUEMANN 1992) other titanium silicates which can be used as catalysts in the process of the present invention belong to the family of ETS molecular sieves in which the titanium atoms are situated in octahedric coordination (U.S. Pat. No. 4,853,202), as well as analogous products containing aluminum, ETAS aluminosilicates (U.S. Pat. No. 4,853, 202).

Another example of materials which can be used are zeolites with a beta structure containing Titanium.

The titanium silicalite of the invention (TS1) is prepared by adding a mixture of a Ti alkoxide (IV) and a quaternary ammonium hydroxide to a solution of an alkyl orthosilicate to form a hydrogel.

The hydrogel is then crystallized, the crystals are separated from the precipitation solution, dried and then calcined.

The solid microporous material containing titanium can also be prepared by expansion of minerals based on clay, such as smectite, Ca-Bentanite, Na-bentonite or Hectorite, in the presence of titanium compounds or colloidal particles of titanium, as described in Synthesis of microporous materials, Vol. II, M. Occelli, M. E. Robson.

Smectites are aluminosilicates formed from layers containing a distinct negative charge compensated by mono and divalent, exchangeable cations.

By the exchange of these cations with large polyoxycations or with colloidal particles of titanium, the layers of clay can expand and form microporous structures suitable for absorption and catalysis.

It is known that the method used for removing the liquid phase and for drying these expanded clays is very important for determining the physico-chemical properties of these catalysts.

For example, when smectites are expanded with colloidal particles of $SiO_2$—$TiO_2$ they produce microporous structures whose properties greatly depend on the drying method used.

The drying of these materials with supercritical liquids such as carbon dioxide, produces expanded structures characterized by a much wider surface area and pore volume than that observed in the same material when it is dried with air (Microporous Material, I, pages 99–113, 1953, Elsevier Sci. Publ., M. L. Occelli).

Of particular interest for the present invention are also mesostructured materials containing titanium atoms, synthesized from titanium-silicates and titanium-alumino-silicates in the presence of a surfactant (J. Chem. Soc. Chem. Comm. A. Corma, 147–148, 1994; Nature, 368 pages 321–323, 1994).

In these materials the hydrophobic tails of the hydrocarbon surfactant bend over leaving the polar ends on the outside.

The flat or folded surfactant molecules join at the front forming columns around which the hydrogel crystallizes.

After calcination, the removal of the organic template leaves an arrangement of hexagonal channels stable at 800° C. and with a surface area of between 1000–1500 $M^2/g$.

Modern FCC commercial catalysts consist of microspheres having a particle size distribution of between 10 and 130$\mu$ with an average particle dimension of between 60–80$\mu$ and an apparent density of between 0.7 and 1 g/cc.

The main components are zeolite (10–40%), a compound based on mineral clays (filler, in a quantity of between 40–90%) such as for example bentonite, kaolinite, halloysite and a compound (binder in a quantity of between 0–20%) based on colloidal alumina or aluminosilicates.

Each of these is responsible for specific functions: the zeolite is the true catalytic site responsible for the conversion and selectivity, the filler dilutes the zeolitic activity, the binder ensures the physical stability of the particles.

The filler-binder combination is frequently called matrix.

The matrix can have a catalytic activity and this function is particularly important for the cracking of large molecules (residues).

Zeolites used at present in the FCC catalyst are based on the faujasite structure; they derive from the common synthesis of the NaY zeolite and are differentiated by successive treatment suitable for stabilizing the zeolite or modifying its catalytic activity/selectivity by appropriately modifying the level of rare earth.

The microporous material containing titanium can be incorporated into the conventional FCC catalyst in various ways.

For example, it can be mixed directly with the conventional FCC catalyst or first be dispersed in a material selected from alumina, amorphous aluminosilicate or combined with a mineral clay such as Kaolin.

In the FCC process the conversion takes place by putting the heavy hydrocarbon fraction in contact with a fluid bed of particles of catalyst at temperatures of between 500° and 650° C.

The hydrocarbons which are treated in the FCC units generally consist of heavy oils. Typical charges treated in the FCC units comprise Heavy vacuum gasoil, atmospheric residues and occasionally atmospheric gasoils, naphthas and small percentages of vacuum residues.

The catalytic cracking (FCC) is generally carried out by means of a cyclic process which comprises three separate zones: one zone for the catalytic reaction, one zone for the stripping with vapor of the hydrocarbons from the exhausted catalyst and one for the regeneration of the exhausted catalyst.

The hydrocarbons are mixed with an appropriate quantity of catalyst particles, the mixture is then passed through a catalytic reactor, normally called "riser", in which it is subjected to cracking at temperatures of between 500° and 650° C., to convert the heavy hydrocarbon fraction into gaseous hydrocarbons with a low boiling point.

The products, which on leaving the riser are in a gaseous state, are separated from the catalyst.

The catalyst which loses its activity owing to the carbon which is deposited on its surface, is separated from the gaseous hydrocarbons by means of a cyclone separator and subsequently sent to a stripper where the adsorbed hydrocarbons are removed by vapor.

The removed hydrocarbons are then combined with the vapors leaving the cyclone and the mixture is sent downstream of the plant for further treatment.

The particles of catalyst recovered from the stripper are sent to a regenerator, usually a fluid bed regenerator, in which the carbon is eliminated by combustion in the presence of a gas containing oxygen at temperatures of between 550 and 815° C.

The coke deposited is burnt and the regenerated catalyst re-enters the riser.

The cyclic process is then completed by mixing the particles of reactivated catalyst with the hydrocarbon fractions sent to the riser.

The following examples are purely illustrative and do not limit the scope of the invention in any way.

EXAMPLE 1

A solution of "hydrogel" is prepared by adding dropwise Ti(IV) ethoxide (of ALDRICH) and a solution at 20% of tetrapropyl ammonium (TPA) hydroxide to tetraethylorthosilicate (produced by Fisher Scientific Co.) to form a mixture with the following molar composition of oxides:

$$TiO_2 : 32.8 \ SiO_2 : 7.6 \ (TPA)_2O : 675 \ H_2O$$

The hydrogel is then heated to about 60° C. under stirring for a period of about 10 hours to eliminate all the alcohol formed during the preparation of the gel. The losses in weight are compensated by the addition of water. The gel is then put into a BERGHOFF pressure-resistant reactor covered with teflon where it is heated to 175° C. (±2) for a period of about 30 hours.

The resulting crystals are separated from the liquid phase by centrifugation. The excess of the reagents is removed from the solid phsae by repeated washing with hot deionized water. The washed crystals are subsequently first dried in air at 100° C. for 5 hours and then calcined in a flow of air at 540° C. for 10 hours.

The calcined samples have a content of $TiO_2$ equal to about 1.4% and a BET surface area of 390 m²/g. The X-ray crystallogram of the calcined crystals is shown in FIG. 1, the relative intensities are indicated in table 1. The results in FIG. 1 and tab.1 show that the crystals are TS-1.

EXAMPLE 2

The purpose of this example is to illustrate the preparation of a microporous solid containing Ti by the expansion of a commercially available sample of Bentonite.

The clay sample is a Ca-Bentonite obtained from Southern Clay Products Inc. of Gonzales (Tex.). The sample used contains a concentration of impurities of quartz estimated at about 10–15%, with 0.71% of $Fe_2O_3$.

The "pillaring solution" is prepared by adding a mixture of Ti (IV) isopropoxide and tetraethyl orthosilicate to a solution of HCl 2.5 M.

The resulting mixture having the following composition:

$$TiO_2 : 5 SiO_2 : 20 \ HCl : 2220 \ H_2O$$

is left to hydrolyze for 10 hours under stirring at 25° C. This "pillaring agent" is then added to a slurry containing 1% by weight of clay and is left to react at 25° C. for a period of 2 hours. The clay thus expanded is then filtered and repeatedly washed with distilled water at 60° C.

After drying in air at 100° C. for 10 hours, the expanded clay has a surface area of 403 m²/g and a content of $TiO_2$ of 7.14%.

EXAMPLE 3

A catalyst based on expanded clays is prepared as described in example 2 with the exception that zirconium n-propoxide is used instead of the Ti(IV) isopropoxide to generate a "pillaring solution" with the following composition:

$$ZrO_2 : 5SiO_2 : 27.5 \ HCl : 2156 \ H_2O.$$

The "pillaring solutions" is reacted with the same Bentonite described in example 2.

After drying in air at 100° C. for 10 hours, the expanded clay has a surface area of 354 m²/g.

EXAMPLE 4

The activity measurements towards the cracking reaction were obtained by means of the "microactivity test" using an Xytel microreactor in accordance with ASTM D3907 and D5154 specifications. All the catalysts are tested at 527° C. and with catalyst-charge contact times of 30 sec.

The ratio catalyst/oil varies from 4.5 to 6 using 5 g of catalyst and WHSV of 30, 24 and 20. The charge is a vacuum gasoil whose characteristics are shown in table 2. The physico-chemical properties of the commercial FCC catalyst are indicated in table 3. Any commercially available catalyst with a zeolite content of between 10–45%, can be used as host catalyst.

The FCC material described in table 3 and the Ti silicalite crystals described in example 1 are mixed to form a mixture containing 30% by weight of zeolite TS-1.

The mixture is then hydrothermally deactivated by passing 100% vapor at 1 atm and 760° C. for 5 hours. The results of the "microactivity test" are shown in FIGS. 2 and 3. The physical properties of the FCC catalyst without TS-1 are indicated in table 3. After the addition of 30% of TS-1 and calcination at 540° C. for 10 hours, the DFCC (dual function cracking catalyst) has a BET surface area of 358 m²/g which becomes 280 m²/g after hydrothermal deactivation.

Figure 2A:
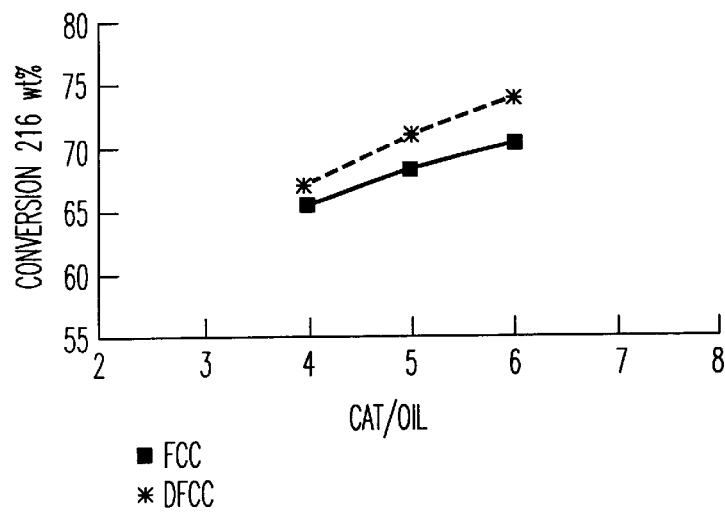
FIG. 2a illustrates results of a microactivity test for three c/o ratios for cracking.
Figure 2B:
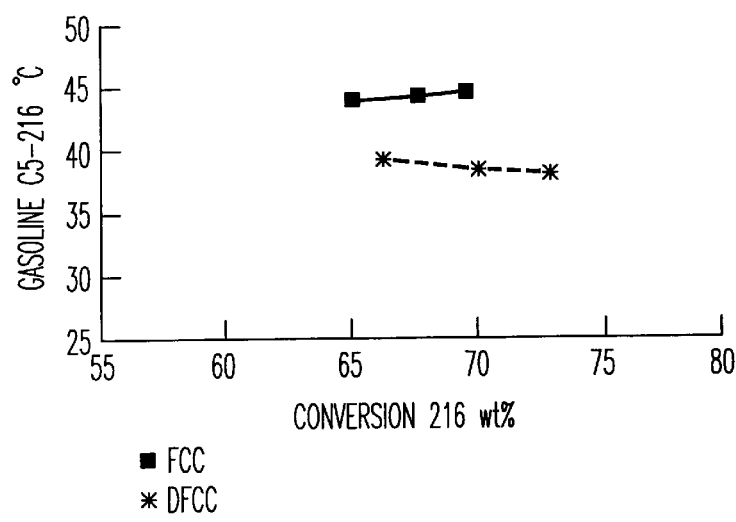
FIG. 2b illustrates that adding TS-1 crystals to a host catalyst causes overcracking of a gasoline fraction.
Figure 2C:
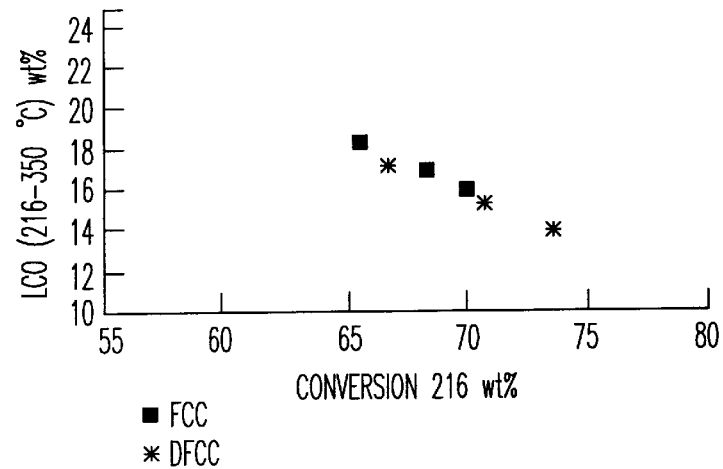
FIGS. 2c and 2d illustrate that adding TS-1 crystals to host catalyst causes overcracking of gasoline without modifying yields of LCO and HCO, respectively.
Figure 2D:
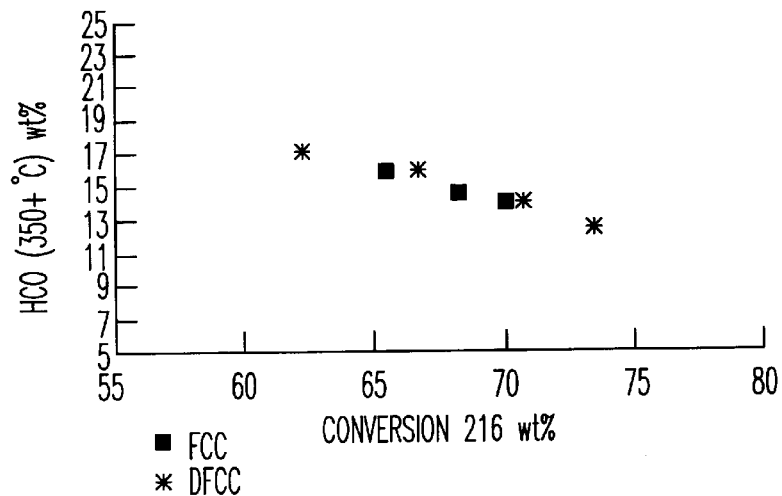

The activity with respect to the cracking is specified in relation to the three C/O ratios used (FIG. 2A). The results in FIG. 2B indicate that the TS-1 crystals added to the host catalyst cause overcracking of the gasoline fraction without modifying the yields of LCO and HCO as indicated in FIGS. 2C 2D.

The gasoline fraction is converted into $C_3$ and $C_4$ fractions rich in olefins.

Figure 2E:
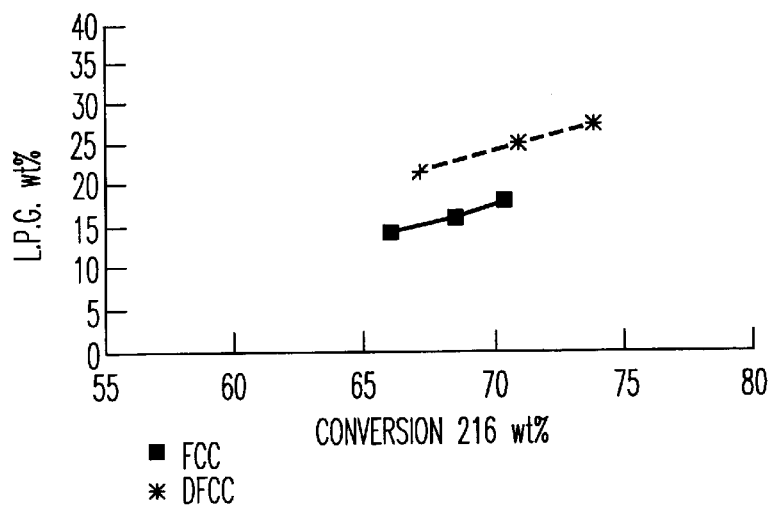
FIGS. 2e and 2f illustrate that adding TS-1 crystals to host catalyst causes an increase in the yield of LPG and olefinicity, respectively.
Figure 2F:
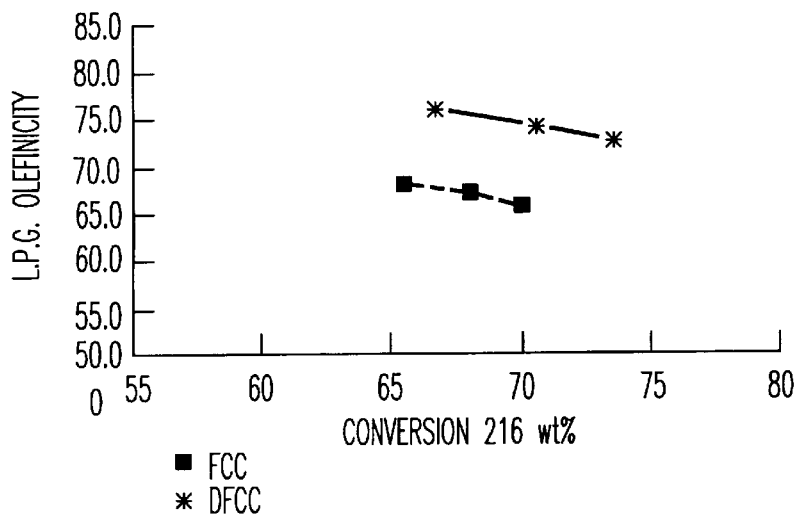

This increase in the yield of LPG and in its olefinicity is indicated in FIGS. 2E and 2F.

The results in FIG. 2A are unexpected.

In fact, whereas the TS-1 zeolite used as such has a poor intrinsic activity, after the addition, instead of observing a loss in activity as an effect of dilution due to the addition of TS-1, there is an unexpected increase in the activity of the DFCC.

The tendency of the commercial FCC catalyst to produce a higher yield of olefins following the addition of TS-1 is further illustrated in FIG. 3. Both the $C_3$ and $C_4$ olefins increase after the addition of TS-1 and this higher yield is observed for all the conversion levels examined (FIGS. 3A and 3B).

Figure 3A:
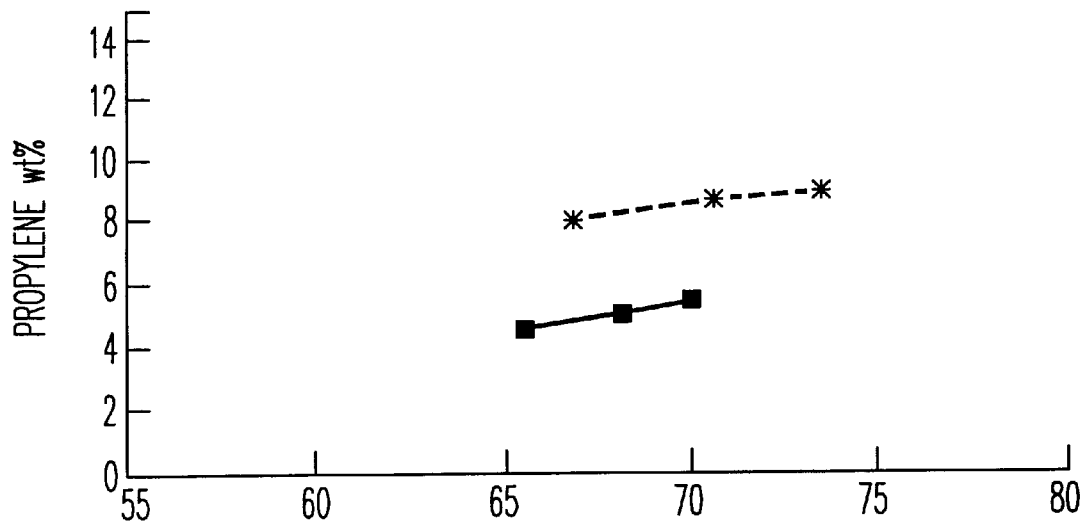
FIGS. 3a and 3b illustrate the higher yield of olefin produced by adding TS-1 to commercial FCC catalyst for different conversion levels.
Figure 3B:
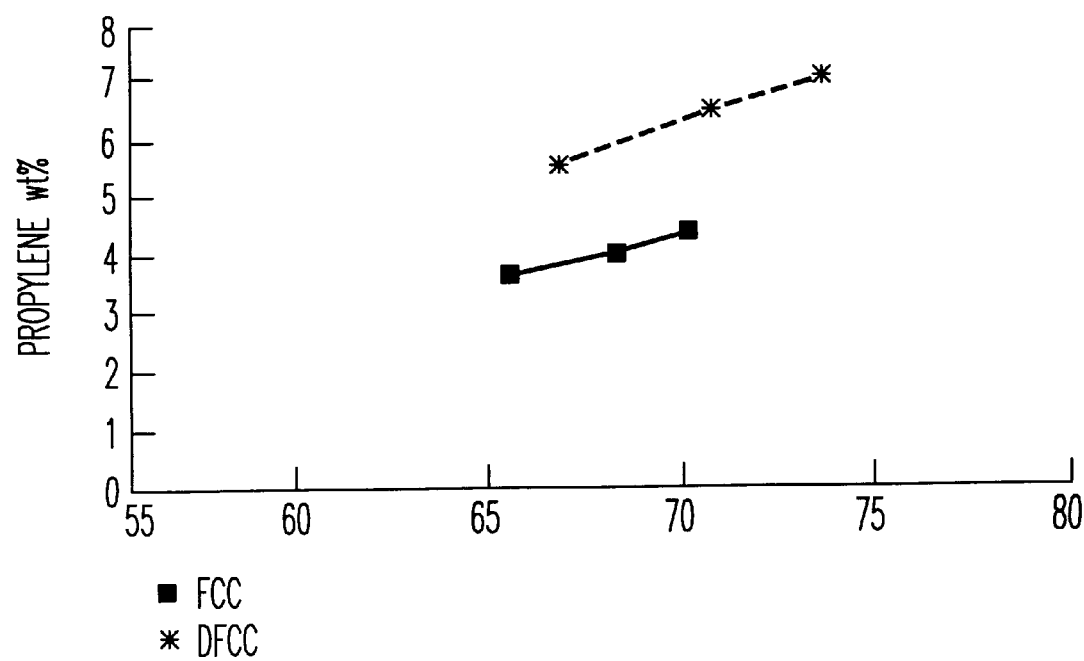
Figure 3C:
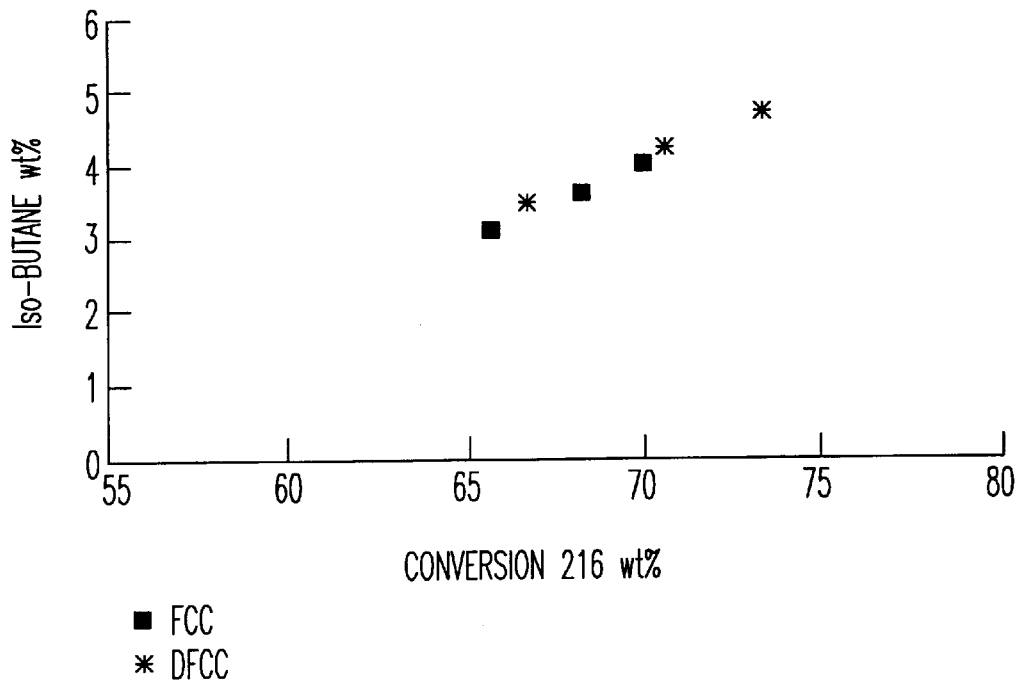
FIGS. 3c and 3d illustrate that although the yield of iso-$C_4$ remains constant after the addition of TS-1, production of isobutylene is considerably increased as well as octane number.
Figure 3D:
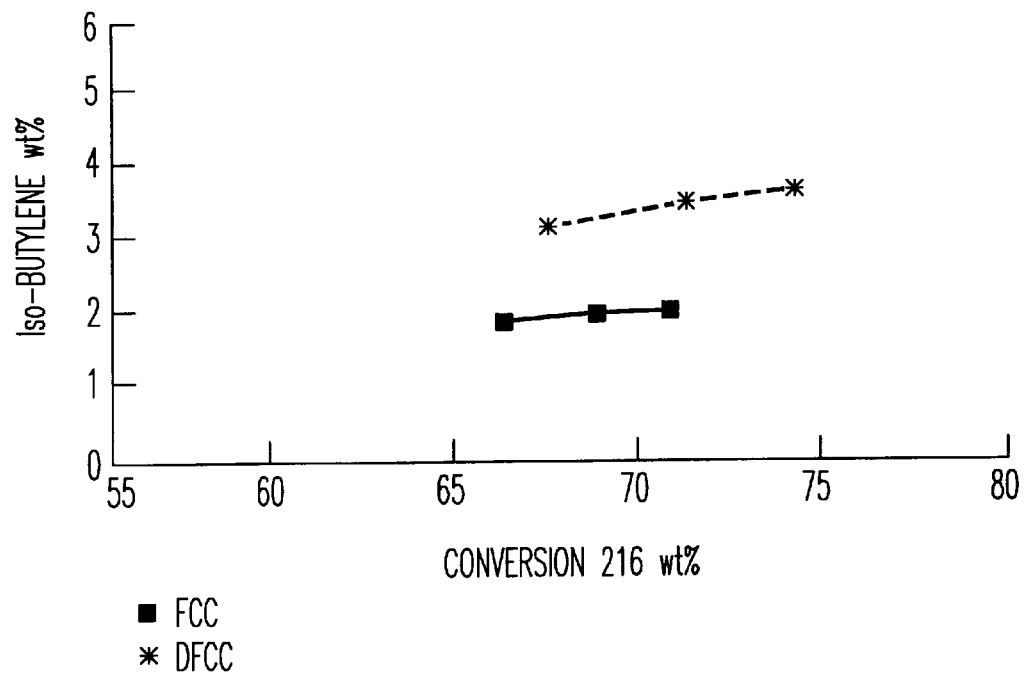

In particular it should be noted that, although the yield of iso $C_4$ remains constant after the addition of TS-1 the production of isobutylene is considerably increased (FIGS. 3C, 3D). Also the octane number of the gasoline undergoes a considerable increase.

The RON increases by 2 about points and the MON by about 1.5 points (Tab.4).

EXAMPLE 5

The purpose of this example is to illustrate the use of microporous solids containing Titanium obtained from clays as FCC additives in the present invention.

The host catalyst described in Table 3 and the microporous materials described in example 2 are mixed to form a mixture containing 30% by weight of expanded clay.

This mixture is hydrothermally deactivated as described in example 4 and then evaluated for the cracking activity.

In this example an anular fixed bed microreactor sold by Sotelem was used.

The results in table 5 indicate that the addition of a thermo-stable and catalytically active component such as the expanded clay of example 2 increases the cracking activity by decomposing some of the gasoline components to generate higher yields of LPG rich in olefins. In fact the yield of LPG increases from 15.1% to 22.2% whereas the $C_3$ and $C_4$ olefins increase from 10.0% to 12.9% after the addition of the expanded clay containing Ti to the commercial FCC catalyst, Table 5.

EXAMPLE 6

The host catalyst described in example 4 and the microporous material containing Zr described in example 3 are mixed to form a mixture containing 30% by weight of expanded clay whose mixture is hydrothermally deactivated and tested as described in example 4.

The results of the "Microactivity test" indicated in table 5 show that this type of additive containing Zr is not as effective as the analogous product containing Ti.

A slight dilution effect is responsible for the decrease in the activity and yield of gasoline. In any case the yields of LPG and olefins remain basically unvaried.

Table 5 also indicates that, when a catalytically non-active clay such as Sepiolite is added at the same concentration, a very distinct dilution effect can be observed and the resulting catalyst loses its cracking properties (Table 5).

TABLE 1

PEAK IDENTIFICATION PARAMETERS

| | |
|---|---|
| Threshold values: | 5.0, 10.0 |
| Sound intensity: | 0.0 |
| Typical width at mid height: | 0.20 |
| Minimum width at mid height: | 0.08 |
| Peak width: | 15 |

| PEAK | 2-THETA | D-SPACE | I (REL) | I (CPS) | FWHAM |
|---|---|---|---|---|---|
| 1 | 4.600 | 19.1942 | 4.51 | 139.3 | 0.343 |
| 2 | 7.950 | 11.1120 | 100.00 | 3088.8 | 0.331 |
| 3 | 8.850 | 9.9839 | 67.05 | 2071.2 | 0.388 |
| 4 | 11.950 | 7.4000 | 3.44 | 106.2 | 0.900 |
| 5 | 12.350 | 7.1612 | 2.38 | 73.6 | 0.350 |
| 6 | 12.550 | 7.0475 | 2.78 | 85.8 | 0.550 |
| 7 | 13.250 | 6.6767 | 7.92 | 244.6 | 0.337 |
| 8 | 13.950 | 6.3432 | 13.11 | 404.8 | 0.331 |
| 9 | 14.850 | 5.9608 | 20.70 | 639.4 | 0.380 |
| 10 | 15.550 | 5.6940 | 11.41 | 352.6 | 0.343 |
| 11 | 15.950 | 5.5521 | 13.25 | 409.3 | 0.294 |
| 12 | 16.600 | 5.3361 | 3.25 | 100.3 | 0.330 |
| 13 | 17.350 | 5.1071 | 3.49 | 107.8 | 0.397 |
| 14 | 17.750 | 4.9929 | 9.71 | 300.0 | 0.384 |
| 15 | 19.300 | 4.5953 | 6.12 | 189.2 | 0.342 |
| 16 | 19.650 | 4.5142 | 2.57 | 79.2 | 0.750 |
| 17 | 19.850 | 4.4692 | 2.78 | 85.9 | 0.750 |
| 18 | 20.050 | 4.4250 | 3.08 | 95.2 | 0.800 |
| 19 | 20.400 | 4.3499 | 8.75 | 270.1 | 0.333 |
| 20 | 20.900 | 4.2469 | 12.31 | 380.1 | 0.379 |
| 21 | 21.850 | 4.0644 | 3.86 | 119.3 | 0.447 |
| 22 | 22.250 | 3.9922 | 7.35 | 227.1 | 0.348 |
| 23 | 23.250 | 3.8227 | 81.00 | 2502.1 | 0.436 |
| 24 | 23.750 | 3.7434 | 28.27 | 873.1 | 0.400 |
| 25 | 24.000 | 3.7049 | 41.92 | 1295.0 | 0.488 |

TABLE 1-continued

PEAK IDENTIFICATION PARAMETERS

| | |
|---|---|
| Threshold values: | 5.0, 10.0 |
| Sound intensity: | 0.0 |
| Typical width at mid height: | 0.20 |
| Minimum width at mid height: | 0.08 |
| Peak width: | 15 |

| PEAK | 2-THETA | D-SPACE | I (REL) | I (CPS) | FWHAM |
|---|---|---|---|---|---|
| 26 | 24.450 | 3.6378 | 22.68 | 700.6 | 0.331 |
| 27 | 24.900 | 3.5730 | 3.07 | 94.9 | 0.331 |
| 28 | 25.400 | 3.5038 | 8.40 | 259.4 | 0.643 |
| 29 | 25.950 | 3.4308 | 7.70 | 237.9 | 0.835 |
| 30 | 26.800 | 3.3239 | 7.72 | 238.6 | 0.397 |
| 31 | 27.000 | 3.2997 | 10.03 | 309.9 | 0.587 |
| 32 | 27.550 | 3.2351 | 3.48 | 107.6 | 0.390 |
| 33 | 28.100 | 3.1730 | 2.37 | 73.3 | 0.437 |
| 34 | 28.500 | 3.1293 | 4.51 | 139.3 | 0.293 |
| 35 | 29.350 | 3.0406 | 10.24 | 316.3 | 0.339 |
| 36 | 30.000 | 2.9762 | 13.96 | 431.3 | 0.447 |
| 37 | 30.450 | 2.9332 | 7.04 | 217.6 | 0.396 |
| 38 | 31.300 | 2.8555 | 2.99 | 92.4 | 0.400 |
| 39 | 32.850 | 2.7242 | 4.93 | 152.1 | 0.335 |
| 40 | 34.450 | 2.6013 | 5.75 | 177.6 | 0.397 |
| 41 | 34.900 | 2.5687 | 3.36 | 103.9 | 0.793 |
| 42 | 35.250 | 2.5440 | 2.98 | 92.1 | 0.497 |
| 43 | 35.800 | 2.5062 | 3.75 | 115.8 | 0.381 |
| 44 | 36.150 | 2.4827 | 6.98 | 212.8 | 0.335 |
| 45 | 36.300 | 2.4728 | 4.15 | 128.1 | 0.191 |
| 46 | 37.300 | 2.4088 | 3.91 | 120.9 | 0.497 |
| 47 | 37.650 | 2.3872 | 4.76 | 146.9 | 0.690 |
| 48 | 41.050 | 2.1970 | 2.58 | 79.7 | 1.092 |
| 49 | 43.500 | 2.0788 | 2.28 | 70.4 | 0.200 |
| 50 | 45.150 | 2.0065 | 9.71 | 300.1 | 0.736 |
| 51 | 45.550 | 1.9899 | 9.27 | 286.3 | 0.545 |
| 52 | 46.600 | 1.9474 | 2.38 | 73.6 | 0.344 |
| 53 | 47.550 | 1.9107 | 3.93 | 121.3 | 0.484 |

53 peaks were found and registered in the peak file

TABLE 2

Charge characteristics

| | |
|---|---|
| Density Kg/l | 0.9210 |
| ° API | 22.1 |
| Viscosity 70° C. (cst) | 21.299 |
| Viscosity 100° C. (cst) | 8.678 |
| Aniline point (° C.) | 86.3 |
| Total ppm weight Nitrogen | 1266 |
| Basic ppm weight Nitrogen | 379 |
| Refractive Index 20° C. | 1.5115 |
| R.C.C. weight % | 0.45 |
| Ni ppm | 0.14 |
| V ppm | 0.33 |
| Cu ppm | <0.1 |
| Fe ppm | 0.96 |
| Na ppm | 5 |
| S weight % | 1.66 |
| ASTM D1160 | |
| I.P: ° C. | 349 |
| 5% vol. (° C.) | 385 |
| 10% vol. (° C.) | 399 |
| 30% vol. (° C.) | 433 |
| 50% vol. (° C.) | 458 |
| 70% vol. (° C.) | 488 |
| 90% vol. (° C.) | 543 |
| 95% vol. (° C.) | N |
| F.B.P. (° C.) | 556 (rec. 95%) |

TABLE 3

| Catalyst: Physico-Chemical Properties | | |
|---|---|---|
| B.E.T. Surface area | $m^2/g$ | 338 |
| ABD | g/cc | 0.73 |
| $Al_2O_3$ | % | 28.0 |
| Na | % | 0.43 |
| Fe | % | 0.20 |
| Ti | % | 0.37 |
| $RE_2O_3$ | % | 0.02 |
| PSD | | |
| 0–20 micron | % | 1 |
| 0–40 micron | % | 14 |
| 0–80 micron | % | 56 |
| 0–105 micron | % | 75 |
| 0–149 micron | % | 92 |
| APS | micron | 72 |
| Davison index | | 4.3 |

TABLE 4

| | Basic Case | | DFCC | | |
|---|---|---|---|---|---|
| Cat/Oil | 5 | 6 | 4 | 5 | 6 |
| RON | 91.4 | 92.9 | 93.3 | 94.3 | 95 |
| MON | 79.6 | 80.1 | 80.2 | 80.8 | 81.7 |

TABLE 5

| | Basic case | DFCC Sepiolite | DFCC Ex. 3 | DFCC Ex. 2 |
|---|---|---|---|---|
| Convers. 221% w | 72.2 | 63.0 | 68.8 | 78.2 |
| $C_3 + C_4$ w % | 5.1 | 3.8 | 5.0 | 9.3 |
| $C_3= +C_4=$ w % | 10.0 | 9.4 | 10.4 | 12.9 |
| LPG w % | 15.1 | 13.2 | 15.4 | 22.2 |
| $C_5$-221 gasoline w % | 50.5 | 44.3 | 47.0 | 47.0 |
| Surf. area $m^2/g$ Calcined | 338 | — | 259 | 229 |
| Surf. area $m^2/g$ Steamed | 237 | 189 | 170 | 205 |

What is claimed is:

1. A fluid catalytic cracking process for preparing hydrocarbon fractions from one or more heavy hydrocarbon fractions, which comprises contacting the one or more heavy hydrocarbon fractions, under cracking conditions, with a catalytic composition comprising an FCC catalyst and a quantity of between about 3–60% of a hydrothermally stable microporous material containing titanium, wherein the material containing titanium is selected from the group consisting of a TS-1 titanium silicate with an MFI structure, and a TS-2 titanium silicate with an MEL structure, said TS-1 and TS-2 titanium silicate containing Ti atoms in tetrahedric coordination in an expanded clay.

2. The process of claim 1, wherein the quantity of microporous material containing titanium is equal to 30%.

3. The process of claim 1, wherein the TS-2 titanium-silicate contains at least 0.01% of titanium.

4. The process of claim 1, wherein the expanded clay is selected from the group consisting of Ca-bentonite, Na-bentonite, and Hectorite.

5. The process of claim 1, wherein the FCC catalyst contains zeolite in an amount of between about 10 and 40%.

6. The process of claim 1, wherein the FCC catalyst comprises microspheres having a particle size distribution of between about 10 and 130 μm with an average particle dimension of between about 60–80 μm in an apparent density of between about 0.7 and 1 g/cc.

7. The process of claim 1, which is effected at a temperature in the range of 500 to 650° C.

8. The process of claim 1, which comprises:

a) mixing said one or more heavy hydrocarbon fractions with an effective amount of catalyst particles;

b) passing the mixture through a catalytic reactor; and c) separating products leaving the catalytic reactor from the catalyst particles.

* * * * *